July 7, 1970     D. E. DELL'AGNESE ET AL     3,518,817

CUPOLA EXHAUST GAS CONDITIONING APPARATUS

Filed Jan. 11, 1968     2 Sheets-Sheet 1

INVENTORS
TOWNSEND TINKER
DAVID E. DELL'AGNESE

BY

*Morsell & Morsell*

ATTORNEYS

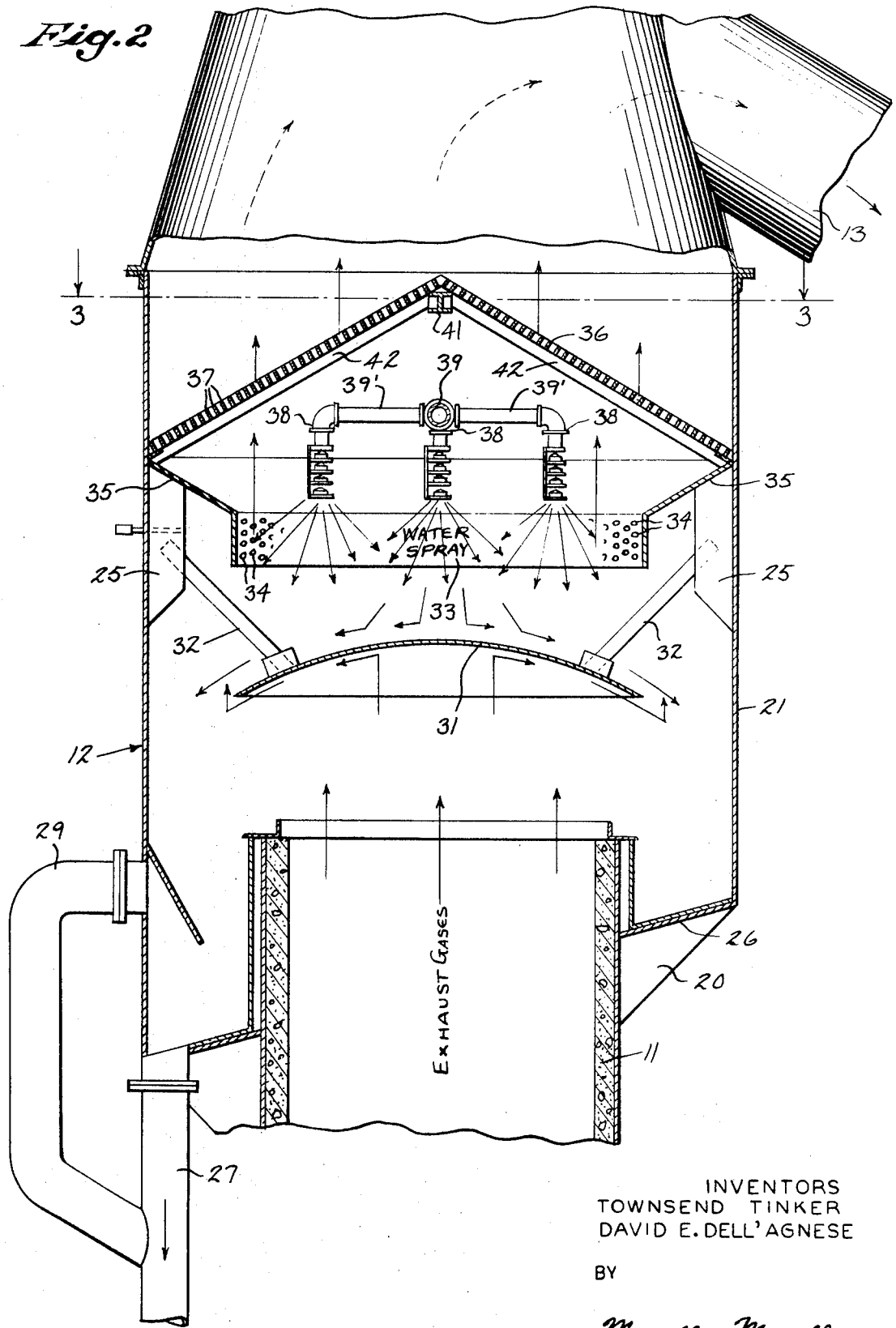

United States Patent Office 3,518,817
Patented July 7, 1970

3,518,817
CUPOLA EXHAUST GAS CONDITIONING APPARATUS
David E. Dell'Agnese, Port Washington, Wis., and Townsend Tinker, Easton, Md., assignors to Modern Equipment Company, Port Washington, Wis., a corporation of Wisconsin
Filed Jan. 11, 1968, Ser. No. 697,194
Int. Cl. B01d 50/00
U.S. Cl. 55—257                                8 Claims

ABSTRACT OF THE DISCLOSURE

A gas conditioning apparatus including an umbrella-like deflector mounted above the cupola stack with a plurality of nozzles spaced thereabove continuously directing a water spray downwardly over said deflector to intercept cupola gases flowing upwardly therearound, said water spray impinging and entraining dirt particles and other suspended matter carried by said gases, the gas stream next being directed into a confined spray zone above said deflector for further, intensified cleaning action by said water spray, and, finally, passed through a specially-designed grating in the upper portion of said apparatus to separate and remove the dirt-entraining water therefrom.

BACKGROUND OF THE INVENTION

Field of the invention

The present invention relates to the conditioning of exhaust combustion gases discharged by cupolas and industrial furnaces to minimize air pollution.

Description of the prior art

Heretofore there have been a number of gas conditioning apparatuses of the type wherein water is directed over a deflector around which exhaust cupola gases flow, said water intercepting the rising gases to partially cleanse and cool the same. Unlike the present invention, however, in all of said prior gas conditioners only a relatively small portion of the dust and other impurities are removed from the gases, thus making it necessary to deliver said partially conditioned gases to a high-energy scrubber or other secondary cleaning equipment if it is desired to remove a greater proportion of the impurities therefrom.

SUMMARY OF THE INVENTION

To reduce air pollution it is required by law in most states that cupolas and industrial furnaces be provided with means for removing a substantial portion of the noxious suspended foreign matter from the gases discharged thereby. The object of the present invention is to provide an improved gas conditioner which is designed to remove a greater proportion of the dust and other suspended matter from exhaust cupola and furnace gases than is removed by prior gas cleaning apparatuses of the same general type. With the improved cupola gas conditioner comprising the present invention it is unnecessary to employ a high velocity scrubber or other secondary cleaning equipment in many applications.

Further objects of the present invention are to provide a new and improved cupola gas conditioning apparatus which is efficient and economical in operation, which is relatively simple and inexpensive in design and construction, and which is otherwise particularly well adapted for its intended purposes.

BRIEF DESCRIPTION OF THE DRAWINGS

In the drawings, wherein the same reference numerals designate the same parts in all of the views:

FIG. 2 is an enlarged vertical sectional view of the improved gas conditioning unit.

DESCRIPTION OF THE PREFERRED EMBODIMENT

Figure 1:
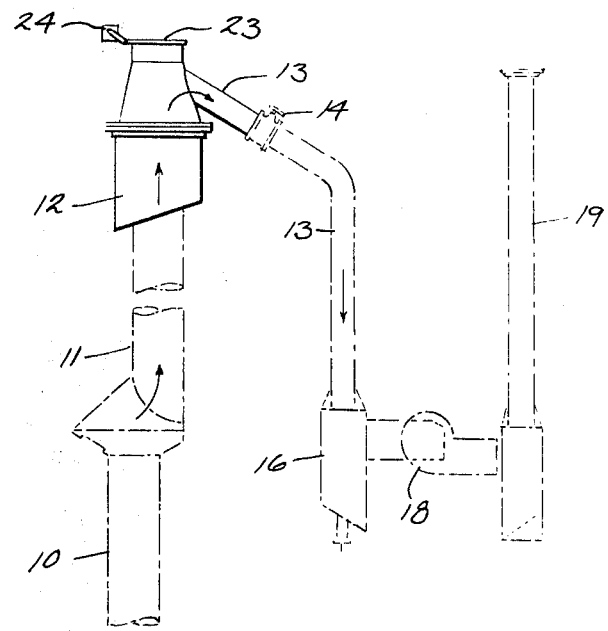
FIG. 1 is a schematic view showing a cupola and a complete exhaust gas treating system that can be employed therewith, the improved conditioner comprising the present invention being shown in full lines and the cupola and associated equipment in broken lines.

Referring now more particularly to FIG. 1 of the drawings, illustrated therein is a cupola 10 having a stack 11. Mounted on the upper portion of said cupola stack is the gas conditioning apparatus comprising the present invention, said apparatus being shown in full lines and designated by the numeral 12. Extending laterally outwardly and downwardly from said conditioner 12 is a duct 13 which is designed to deliver the gases from said conditioner to a high-energy type scrubber 16 for further conditioning in the illustrated embodiment of the invention. In this respect, however, it is to be understood that while a secondary conditioner or scrubber 16 is utilized in combination with the apparatus 12 in the illustrated conditioning system, in many applications the conditioner 12 can be employed as the sole gas cleaning means. This, in fact, is one of the principal features of the present invention.

In the illustrated conditioning system the cupola gases are drawn through the scrubber 16 by means of a fan 18, and are directed upwardly through a separator stack 19 and discharged to the atmosphere.

Referring still to FIG. 1 of the drawings, in the preferred form of the present invention there is mounted on the housing top a cover 23 which is provided with a counterweight 24 to permit the automatic opening of said cover in response to predetermined gas pressure in said apparatus. Thus there is provided a safety relief valve in the event of a dangerous pressure buildup. In addition, said cover 23 can be opened and a valve 14 in the duct 13 closed if repairs should be necessary to the fan or in the event of other necessary repair or maintenance work in the system downstream of said conditioning apparatus.

With reference now to FIG. 2 of the drawing, the conditioning apparatus 12 comprising the present invention includes a generally cylindrical housing 21 which is fitted over and around the upper end of the cupola exhaust stack 11, as described, there being suitable support brackets 20 therefor. The bottom 26 of said housing is preferably inclined to form a drain trough, and depending from the lower end thereof is a drain pipe 27. In the operation of the present invention water is continuously evacuated through said drain pipe 27, and in the event of blockage in said drain line an overflow pipe 29 spaced above the housing bottom prevents the water from rising above and flowing into the cupola stack 11.

Mounted in the housing 21 in spaced relation directly-above the cupola stack 11 is a deflector head 31 which is supported in centered position within the housing by means of arms 32 secured to and projecting outwardly from the housing wall, there being supported gussets 25 therefor. Said deflector is of a diameter at least as great as that of said cupola stack 11 in order to form an umbrella preventing water from entering said stack during the gas conditioning operation. The upper surface of said deflector is preferably convex in shape to cause water to flow uniformly and evenly thereover, as will be described.

Spaced above the deflector 31, and supported by the gussets 25, is a downwardly-facing open-ended cylinder 33 hereinafter referred to as the spray zone cylinder. Said cylinder 33 is provided with a multitude of small perforations 34, with at least 50% of the cylinder surface being perforated in the preferred form of the invention.

Figure 3:
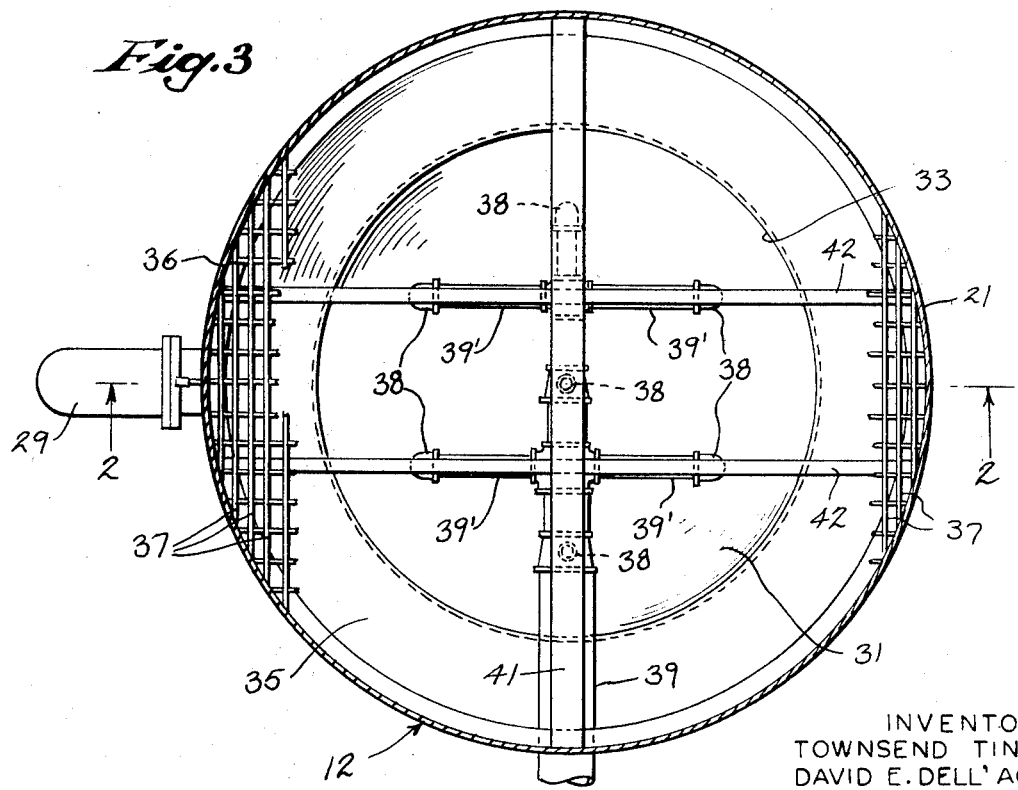
FIG. 3 is a transverse sectional view through the conditioner looking downwardly along line 3—3 of FIG. 2, portions of said unit being broken away to more clearly show the interior thereof.

Positioned immediately above and within the chamber formed by the spray zone cylinder 33 are a plurality of downwardly-directed, large orifice, non-clog nozzles 38 which are connected by pipes 39' to an inlet pipe 39 projecting laterally from the side of said housing. The water delivered under pressure through said inlet pipe can be slurry water, or water from any convenient source. As is shown in FIG. 3, in the illustrated form of the present invention there are seven of said water nozzles 38 mounted in spaced relationship around the housing axis. It is to be understood, however, that the exact number and placement of said nozzles can be varied as desired, it being essential merely that said nozzles be arranged to provide a spray pattern that completely encompasses the area within the spray zone cylinder 33, the function of which will be hereinafter seen.

The spray zone cylinder 33 is provided with a flared, non-perforated upper portion 35 extending outwardly to the housing wall to ensure the rising cupola gases cannot bypass said cylinder, and mounted thereabove is a coaxial, conical grating 36. As illustrated in FIGS. 2 and 3, said grating is formed by a plurality of closely-spaced intersecting bars 37 and includes a supporting beam 41 and removable support channels 42. The grating bars 37 are arranged on a bias relative to the housing axis, and to the flow direction of the gases, the purpose of which will be described.

In the operation of the novel gas conditioning apparatus comprising the present invention, as the exhaust combustion gases flow upwardly through the cupola stack 11 they enter the lower end of the housing 21 and strike the underside of the deflector 31, said gases flowing radially outwardly and upwardly around the periphery of said deflector as indicated by the arrows in FIG. 2. Simultaneously, water is continuously discharged by the spray nozzles 38 downwardly onto the convex upper surface of said deflector, said deflector forming an umbrella to prevent the water from entering the cupola stack 11. As said water passes over the deflector periphery it collides with and forcibly engages the upwardly-flowing gas stream, with the result that minute water droplets are dispersed throughout said gas stream to impinge and entrain dust particles and other suspended matter therein. A substantial quantity of said dirt-entraining water falls to the bottom of the housing 21 where the inclined design of the bottom member 26 functions to minimize the buildup of sludge or sediment and facilitates the evacuation of said water through the drain pipe 29. In addition to the dirt and other solid particles removed by said water droplets, it is to be understood that water-soluble gases and fumes are also acted upon and removed from the gas stream by said water spray.

As the ascending gases continue upwardly around the deflector 31 they are directed into the chamber provided by the spray zone cylinder 33, where the confined nature of said chamber causes the gases flowing therethrough to be thoroughly saturated and impacted by the spray from the adjacent nozzles 38. The result is an intensified cleaning action whereby a substantial portion of the remaining dirt particles and impurities in said gases are impinged and captured by minute water droplets. In addition to the cleaning operation within the confines of said saturating chamber, a portion of the spray water is splashed through the small perforations 34 in the cylinder 33 and is broken up thereby into even finer droplets which descend to intercept the rising combustion gases to trap and remove dirt particles therefrom.

After passing through the spray zone 33 the gases flow upwardly through the moisture impingement trap provided by the grating 36. As hereinabove described, the intersecting bars 37 forming said grating are arranged on a bias relative to the axis of the gas passageway, with the result that the gases strike the angled faces of said bars and the relatively heavy dirt-entraining water therein is impinged on said grating and separated from the gas stream. As water accumulates and condenses on said grating bars, the dust and dirt particles therein agglomerate to form relatively large, heavy particles that cannot be carried upwardly by the gas stream, thus effectively purging said dirt from the gases.

The water and dirt accumulating on the grating 36 eventually drops downwardly to the housing bottom, and as they fall said water droplets function to intercept and capture additional dirt particles and impurities in the rising gases. The result is a complete and thorough cleansing operation whereby a large proportion of the dirt and other noxious suspended matter is removed from the cupola exhaust gases before said gases are discharged to the atmosphere.

From the foregoing detailed description it will be seen that the novel gas conditioning apparatus comprising the present invention is a definite improvement over conventional cupola gas conditioners. With the present invention a substantially greater proportion of the dust and other suspended matter and fumes are removed from the gases, thus making it unnecessary to employ a high velocity scrubber or other secondary cleaning equipment in many applications. In addition, the present apparatus is efficient and economical in operation, and it is relatively inexpensive in design and construction.

It is to be understood that while a preferred embodiment of the present invention has been illustrated and described herein, numerous variations or modifications thereof will undoubtedly occur to those skilled in the art. What is intended to be covered herein is not only the illustrated form of the invention but also any and all variations or modifications thereof as may come within the spirit of said invention, and within the scope of the following claims.

What we claim is:

1. A cupola gas conditioning apparatus, comprising: a housing on the upper end of a cupola exhaust stack, said housing having a top and a bottom; a deflector positioned in said housing directly above said cupola stack whereby exhaust combustion gases passing upwardly through said stack strike the underside of said deflector and are caused to flow radially outwardly and upwardly around the periphery thereof; nozzle means mounted in said housing above said deflector and positioned to continuously direct a spray of water downwardly over said deflector to intercept cupola exhaust gases flowing upwardly therearound to impinge and entrain dirt particles and other supsended matter in said gases; means connecting said nozzle means to a supply of water under pressure; a spray zone of restricted size located between said deflector and said nozzle means in a position whereby said rising cupola gases are directed upwardly therethrough for further, intensified cleaning action by said water spray, said spray zone including a wall member mounted substantially coaxially within the housing and having a multitude of perforations through which water passes to form fine droplets adapted to intercept and trap minute dirt particles in the cupola gases; means associated with said spray zone wall to ensure the rising cupola gases are directed into and upwardly through said spray zone; moisture impingement trap means in said housing above said spray zone, said trap means being adapted to separate and remove the dirt-entraining water from the gases as said gases pass therethrough; and means in the lower portion of said housing for evacuating said dirt-entraining water.

2. A gas conditioning apparatus as recited in claim 1 wherein said moisture impingement trap means comprises a grating formed of a plurality of intersecting bars.

3. A gas conditioning apparatus as recited in claim 2 wherein said grating bars are biased relative to the flow direction of the gases, whereby said gases strike the angled faces of said bars and the dirt-entraining water therein is impinged on said bars, said dirt agglomerating on the grating to form relatively large, heavy particles that cannot be carried upwardly by the gas stream.

4. A gas conditioning apparatus as recited in claim 1 wherein said deflector is provided with a convex top surface to promote the even and uniform distribution of water thereover.

5. A gas conditioning apparatus as recited in claim 1 wherein said nozzle means comprises a plurality of spaced, large, orifice, non-clog nozzles.

6. A gas conditioning apparatus as recited in claim 1 wherein the bottom of said housing is inclined to form a drainage trough, and wherein a drain pipe communicates with the lower end thereof.

7. A gas conditioning apparatus as recited in claim 1 and having an overflow pipe communicating with said housing at a point spaced above the lower end thereof.

8. A gas conditioning apparatus as recited in claim 1 wherein said housing is provided with a pivotal cover on the top thereof adapted to open in response to predetermined gas pressure in said apparatus to provide a safety valve in the event of a dangerous pressure buildup.

References Cited

UNITED STATES PATENTS

| | | | |
|---|---|---|---|
| 1,604,769 | 10/1926 | Fox | 110—119 X |
| 2,073,827 | 3/1937 | Black | 263—29 X |
| 2,387,345 | 10/1945 | Pearl | 261—126 |
| 2,529,045 | 11/1950 | Ortgies | 261—126 X |
| 2,736,541 | 2/1956 | Maiman. | |
| 2,937,013 | 5/1960 | Fisher | 261—17 |

J. SPENCER OVERHOLSER, Primary Examiner

J. S. BROWN, Assistant Examiner

U.S. Cl. X.R.

55—260; 261—106, 111, 117, 126; 266—17